US007388314B2

(12) United States Patent
Lamprecht

(10) Patent No.: US 7,388,314 B2
(45) Date of Patent: Jun. 17, 2008

(54) BRUSH HOLDER FOR AN ELECTRICAL MACHINE

(75) Inventor: Justus Lamprecht, Dusslingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/593,957

(22) PCT Filed: Feb. 9, 2005

(86) PCT No.: PCT/EP2005/050559

§ 371 (c)(1), (2), (4) Date: Sep. 22, 2006

(87) PCT Pub. No.: WO2005/099049

PCT Pub. Date: Oct. 20, 2005

(65) Prior Publication Data

US 2007/0241631 A1 Oct. 18, 2007

(30) Foreign Application Priority Data

Apr. 6, 2004 (DE) ...................... 10 2004 016 809

(51) Int. Cl.
*H02K 13/00* (2006.01)

(52) U.S. Cl. ...................................................... 310/239

(58) Field of Classification Search ................ 310/239, 310/79; 251/159, 335
See application file for complete search history.

(56) References Cited

U.S. PATENT DOCUMENTS

| | | | | |
|---|---|---|---|---|
| 3,628,075 | A * | 12/1971 | Dafler et al. | 310/79 |
| 4,333,631 | A * | 6/1982 | Bosch | 251/159 |
| 5,731,650 | A * | 3/1998 | Scheucher | 310/248 |
| 6,005,323 | A | 12/1999 | Morimoto et al. | |
| 6,270,055 | B1 * | 8/2001 | Szeteli et al. | 251/335.3 |
| 6,536,807 | B1 * | 3/2003 | Raymond et al. | 285/93 |

FOREIGN PATENT DOCUMENTS

DE 197 17 594 A1 10/1998

* cited by examiner

*Primary Examiner*—Thanh Lam
(74) *Attorney, Agent, or Firm*—Ronald E. Greigg

(57) ABSTRACT

The present invention relates to a brush holder for an electrical machine, including a housing for receiving a brush, a prestressing element, and a securing element disposed on the housing, for securing the brush holder to the electrical machine. The securing element is embodied as essentially T-shaped.

14 Claims, 2 Drawing Sheets

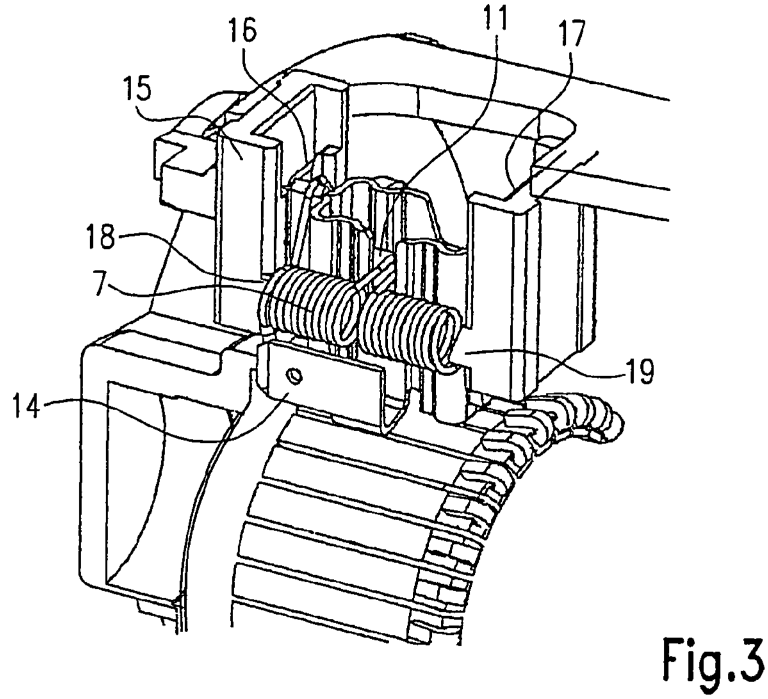
Fig.3
Fig.4
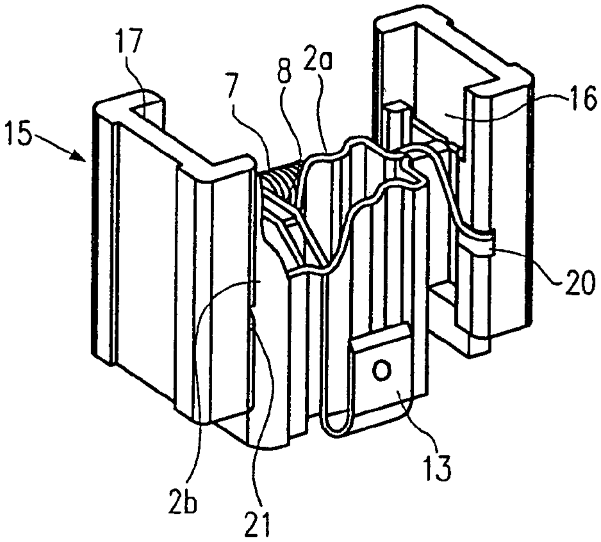
Fig.5
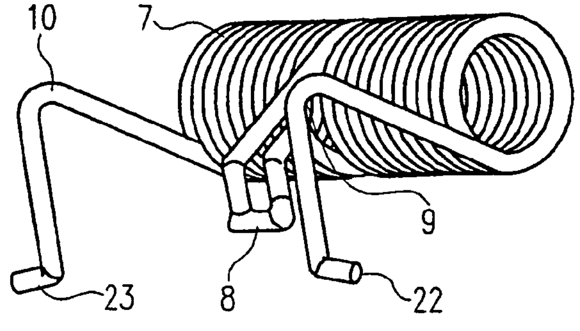

BRUSH HOLDER FOR AN ELECTRICAL MACHINE

CROSS-REFERENCE TO RELATED APPLICATION

This application is a 35 USC 371 application of PCT/EP 2005/050559 filed on Feb. 9, 2005.

BACKGROUND OF THE INVENTION

1. Field of the Invention

The present invention relates to an improved brush holder for an electrical machine, and in particular to a brush holder for an electric motor for power tools.

2. Description of the Prior Art

Brush holders for electrical machines are known in manifold forms from the prior art. For instance, in universal electric motors of the kind typically used in power tools, such as right-angle sanders, power drills, and the like, the necessary current reversal (commutation) is effected with the aid of a commutator. The transmission of the current to the commutator is done by means of carbon brushes. These carbon brushes are disposed in a brush holder, which must furnish exact guidance of the brush and a necessary, metered contact pressure. From Swiss Patent Disclosure CH 493 115, a brush holder is known in which prestressing is exerted on the brushes by means of a spring tongue and a tension spring. Between the brush and the pressure tongue, a cylindrical contact-pressure member is provided, which presses into a V-shaped notch in the carbon brush, in order to exert a uniform contact pressure on the brush.

SUMMARY AND ADVANTAGES OF THE INVENTION

The brush holder of the invention has the advantage by comparison that it can be secured especially simply to an electrical machine. For that purpose, according to the invention, a securing element is provided which essentially has a T shape. As a result, a firm and exact seat of the brush holder with minimized inducement to vibration can be attained. The T-shaped securing element can simply be thrust against a suitably formed receptacle, so that no fastening screw or the like is necessary. Moreover, openings in the region of the electrical machine can be reduced as a result, so that an improvement in the rigidity of the electrical machine can be attained.

Especially preferably, the securing element has two essentially T-shaped elements, which are disposed on the brush holder on its diametrically opposed ends.

To make it especially economical to produce, the T-shaped securing element is formed in one piece with the housing of the brush holder. Especially preferably, the housing of the brush holder is made from two sheet-metal strips which are reshaped such that they form the housing with integrally formed securing elements. Each housing part then preferably forms one leg of the T-shaped securing element. Alternatively, the housing may be formed in one piece. To that end, a sheet-metal strip is reshaped to suit a desired external housing shape, and then a slot is made in the unshaped sheet-metal strip. The sheet-metal strip is then bent over along the slot and widened, so that a receiving chamber for the brush is formed.

The prestressing element is preferably retained on the electrical machine and thus is not secured to the housing of the brush holder. As a result, no prestressing forces are exerted on the housing of the brush holder, and moreover, an inclination of the housing of the brush holder, which is typically made of metal, to melt out from a plastic holder on the electrical machine is greatly reduced. Moreover, securing the prestressing element to the electrical machine makes it possible for the housing of the brush holder to be fixed in its position by the prestressing element.

Preferably, a prestressing element of the brush holder is embodied as a spring, and especially preferably, the spring is disposed outside the housing. A spring arm exerts the prestressing on the brush through a recess formed in the housing of the brush holder. As a result, the introduction of spring force, or in other words the contact point with the brush, can be located centrally on the brush, so that a uniform distribution of force is brought about at the bracing points of the spring.

Moreover, by disposing the spring element outside the housing of the brush holder, the spring is located relatively far away from a heat introduction point at the contact point with the brush, and thus the spring can be well cooled.

Especially simple fastening of the spring is possible if the spring has two V-shaped spring ends. Especially preferably, the V-shaped spring ends are guided via the base or strut of the T-shaped securing elements.

To achieve even better cooling of the spring, on the side of the housing of the brush holder where the spring is located, the surface of this side is embodied in undulating fashion, so that only a few contact points exist between the housing and the spring, and the carbon brush continues to move smoothly in the quiver, even if it becomes soiled. As a result, a cooling air flow can be conducted between the spring and the housing.

The brush holder of the invention is especially preferably used in electric motors for power tools, since because of the large numbers in which such tools are manufactured, the cost advantages become especially valuable.

Moreover, the above-described spring can be mounted especially simply by snapping the spring onto the brush holder receptacle of the motor housing, pivoting the spring ends over, and clipping them into recesses provided on the housing of the electric motor.

BRIEF DESCRIPTION OF THE DRAWINGS

The foregoing and other features of the invention will become apparent from the detailed description contained herein below, taken in conjunction with the drawings, in which:

FIG. 3 is a perspective view of a mounted brush holder in an electric motor;

FIG. 4 is a perspective view of the fastening of the brush holder of the invention in the receptacle of the electric motor housing; and FIG. 5 is a perspective view of a spring in the mounted state, with other components not shown.

DESCRIPTION OF THE PREFERRED EMBODIMENT

Figure 1:
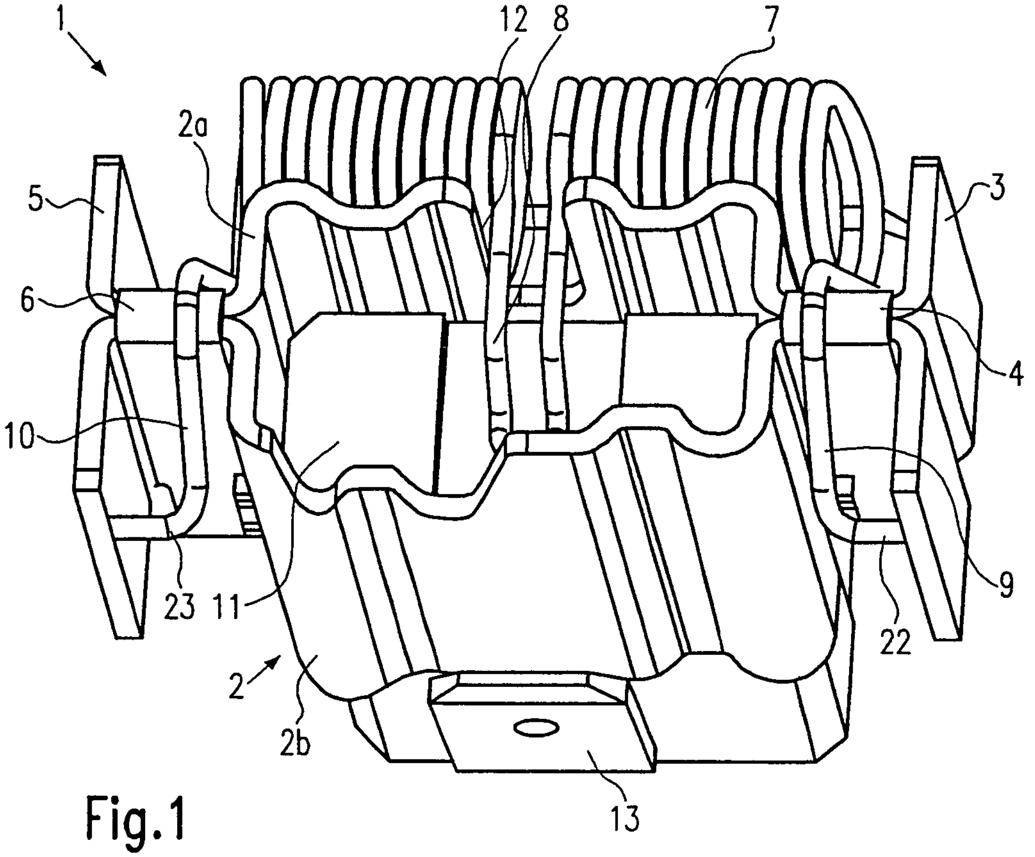
FIG. 1 is a perspective view of a brush holder in an exemplary embodiment of the invention.
Figure 2:
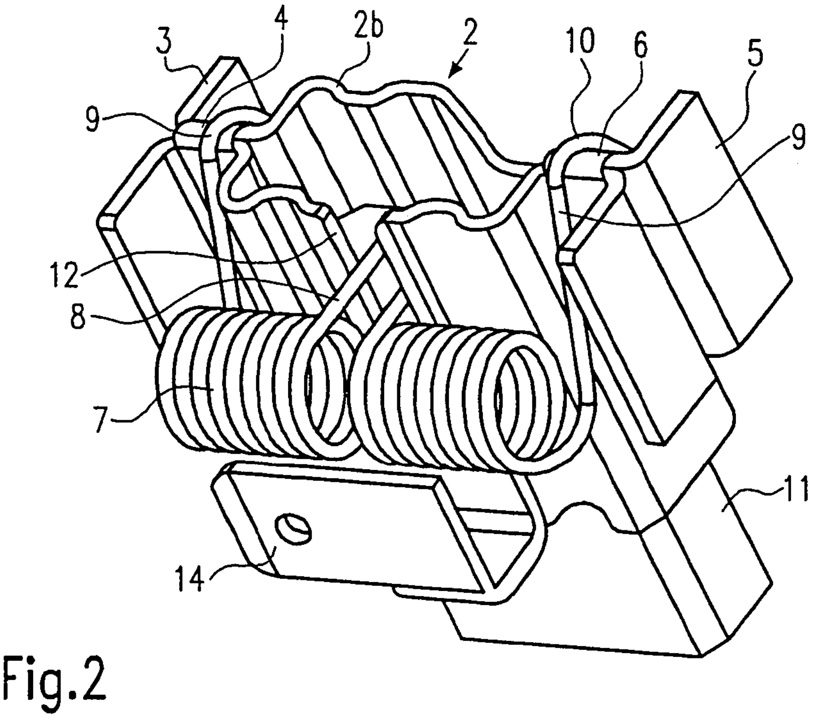
FIG. 2 is a perspective view of the brush holder shown in FIG. 1, seen from the opposite side compared to FIG. 1.

Below, referring to FIGS. 1 through 5, a brush holder 1 in a first exemplary embodiment of the present invention will be described. As shown in FIG. 1, the brush holder 1 includes a housing 2 as well as a spring 7 acting as a prestressing element. The spring 7 is disposed outside the housing 2. The housing 2 comprises two parts 2*a* and 2*b*, which can be made from stamped metal sheets. By reshaping, the two housing parts 2*a*, 2*b* are designed such that one T-shaped securing element 3 and 5 each is formed on the left and right ends. The T-shaped securing elements 3, 5 are each joined to the housing 2 via the base of the T-shaped securing element. At the base of the T-shaped securing element, connecting tabs 4, 6 (see FIG. 1) are embodied, for joining the two housing parts 2*a*, 2*b* firmly to one another. Each free leg of the T-shaped securing element 3 is formed by a respective housing part 2*a*, 2*b*, and the base of the T-shaped securing element is formed by both housing parts 2*a*, 2*b*. The housing 2, which in its interior receives a carbon brush 11, is thus formed. Alternatively, the housing 2 may also be formed in one piece, by reshaping a metal sheet to suit the desired outer design and then making a slot, closed on both ends, in the metal sheet. The metal sheet is then pivoted over along the slot and upset, in order to form the receiving chamber for the brush. The connecting struts 4, 6 are then the ends of the closed slot. To form the T-shaped securing elements 3 and 5, the metal sheet is also slotted before being pivoted over, and the slots are located on a line that also forms the pivot axis. and 5, the metal sheet was also slotted before being pivoted over, and the slots were located on a line that also forms the pivot axis.

The carbon brush 11 is prestressed by the spring 7, so that as shown in FIG. 3, it can be pressed against a rotor of an electrical machine. To that end, a spring arm 8 is embodied on the spring 7 and through a recess 12 formed in the housing 2, this arm exerts a prestressing force on the carbon brush 11. As seen particularly from FIGS. 1 and 5, the spring arm 8 is formed in the middle of the helical spiral spring 7, by rolling one counterclockwise and one clockwise coil of the spring 7 one onto each side of the two-legged spring arm 8. As also seen from FIGS. 2 and 3, the spring 7 is moreover embodied with V-shaped ends 9 and 10. The V-shaped ends 9, 10 of the spring 7 are guided via the base of the T-shaped securing elements 3, 5 and the connecting tabs 4, 6 in such a way that the connecting tabs 4, 6 are located at the kink point of the V-shaped ends 9, 10. Bent ends 22, 23 are additionally embodied on the outermost end piece of each end 9, 10 and engage the recesses (see FIG. 4) on the inside of the brush holder receptacle 15.

A brush terminal 13 and a terminal 14 for a field winding, both embodied as plug-in terminals (see FIGS. 1 and 2), are also provided on the brush holder 1, integrally with the housing 2.

As shown in FIGS. 3 and 4, the brush holder 1 of the invention is thrust into the brush holder receptacle 15 on the electric motor housing and fixed. The fixation on the brush holder receptacle 15 is effected on the one hand via the T-shaped securing elements 3 and 5, which are introduced into a respective channel-shaped slot 16 and 17 (see FIG. 3). The brush holder 1 is also secured to the brush holder receptacle 15 by means of the spring 7. More precisely, two tabs 18 and 19 (see FIG. 3) and two recesses 20, 21 (see FIG. 4) are provided on the brush holder receptacle 15. On the one hand, the outermost ends 22 and 23 of the spring 7 engage the recesses 20 and 21, and on the other, the transition between the V-shaped regions 9 and 10 and the spiral spring regions of the spring 7 are held by the tabs 18 and 19. Since the spring 7 is embodied symmetrically, a centered force can act on the carbon brush 11.

The spring 7 is thus held at only four points on the brush holder receptacle 15 of the electric motor, namely at the two tabs 18 and 19 and the two recesses 20 and 21.

The spring 7 can be secured to the brush holder receptacle 15 of the electric motor simply by clipping it in place and then pivoting over the V-shaped ends. The brush holder 1 is thus held on the brush holder receptacle 15 on the one hand by the T-shaped securing elements 3 and 5 and on the other by the spring 7 itself. As a result, a firm and exact fixation of the brush holder in the motor housing can be attained. Hence the spring 7 has a dual function, namely that of the prestressing element of the carbon brush 11 and the function of fixation of the housing 2 of the brush holder. Thus with a minimum number of components, the housing 2 can be prevented from falling out of the channel-shaped slots 16, 17 in the brush holder receptacle 15.

Also according to the invention, the spring 7 is disposed outside the housing 2 and thus at a certain distance from the carbon brush 11. As a result, the cooling air for the motor can cool these thermally severely stressed components of the brush holder 1 well. Moreover, as shown particularly in FIGS. 1 and 2, the housing side 2*a* on the outside of which the spring 7 is located is embodied in undulating fashion, so that a cooling air flow can develop very well between the housing wall and the spring 7. As a result, additional cooling of the spring 7 can be achieved.

Thus the brush holder 1 of the invention assures an exact and at the same time also sturdy guidance of the carbon brush 11 and furthermore has an especially compact construction. The openings in the housing of the electric motor for the brush holder should be made as small as possible, so that an increased rigidity of the motor housing can be achieved. The symmetrical embodiment of the spring 7 furthermore furnishes a linearly variable spring force that acts on the carbon brush 11, so that especially uniform commutation conditions can be achieved, as the brush mass of the electric motor decreases. Hence an improved brush service life can be achieved in comparison to the prior art, and a brush holder 1 can be furnished which can be produced and mounted especially economically. The brush holder 1 has a very small structural size with a reduced number of parts.

The foregoing relates to a preferred exemplary embodiment of the invention, it being understood that other variants and embodiments thereof are possible within the spirit and scope of the invention, the latter being defined by the appended claims.

The invention claimed is:

1. A brush holder for an electrical machine, the holder comprising a housing for receiving a brush, and a prestressing element, and wherein the housing for receiving the brush is formed with a securing element for securing the brush holder to the electrical machine, the securing element comprising two essentially T-shaped elements disposed on opposite ends of the housing and wherein the prestressing element is disposed on the housing intermediate the two essentially T-shaped elements.

2. The brush holder as defined by claim 1, wherein the T-shaped securing element is formed in one piece with the housing.

3. The brush holder as defined by claim 1, wherein the brush holder is fixed on the electrical machine by means of the prestressing element.

4. The brush holder as defined by claim 2, wherein the brush holder is fixed on the electrical machine by means of the prestressing element.

5. The brush holder as defined by claim 1, wherein the prestressing element is embodied as a spring.

6. The brush holder as defined by claim 5, wherein the spring is disposed outside the housing, and comprises a spring arm which exerts prestressing on the brush through a recess in the housing.

7. The brush holder as defined by claim 5, wherein the spring has essentially V-shaped spring ends for fixing the housing to the electrical machine.

8. The brush holder as defined by claim 6, wherein the spring has essentially V-shaped spring ends for fixing the housing to the electrical machine.

9. The brush holder as defined by claim 7, wherein the essentially V-shaped spring ends are guided via a base of the T-shaped securing elements.

10. The brush holder as defined by claim 1, wherein the prestressing element is fixed at two tabs and two recesses of a brush holder receptacle of the electrical machine.

11. The brush holder as defined by claim 3, wherein the prestressing element is fixed at two tabs and two recesses of a brush holder receptacle of the electrical machine.

12. The brush holder as defined by claim 1, wherein the housing on the side on which the prestressing element rests, comprises an undulating exterior wall.

13. The brush holder as defined by claim 1, wherein the housing is formed of two housing parts, and wherein the T-shaped securing element is formed of the two housing parts, or wherein the housing is embodied in one part with the integrally formed T-shaped securing element.

14. An electrical machine, in particular an electric motor for power tools, including a brush holder as defined by claim 1.

* * * * *